Feb. 28, 1961

E. P. BULLARD III 2,972,907

MACHINE TOOL FEEDWORKS

Filed Nov. 20, 1958

INVENTOR.
EDWARD P. BULLARD III
BY
ATTORNEY

Feb. 28, 1961  E. P. BULLARD III  2,972,907
MACHINE TOOL FEEDWORKS
Filed Nov. 20, 1958  3 Sheets-Sheet 2
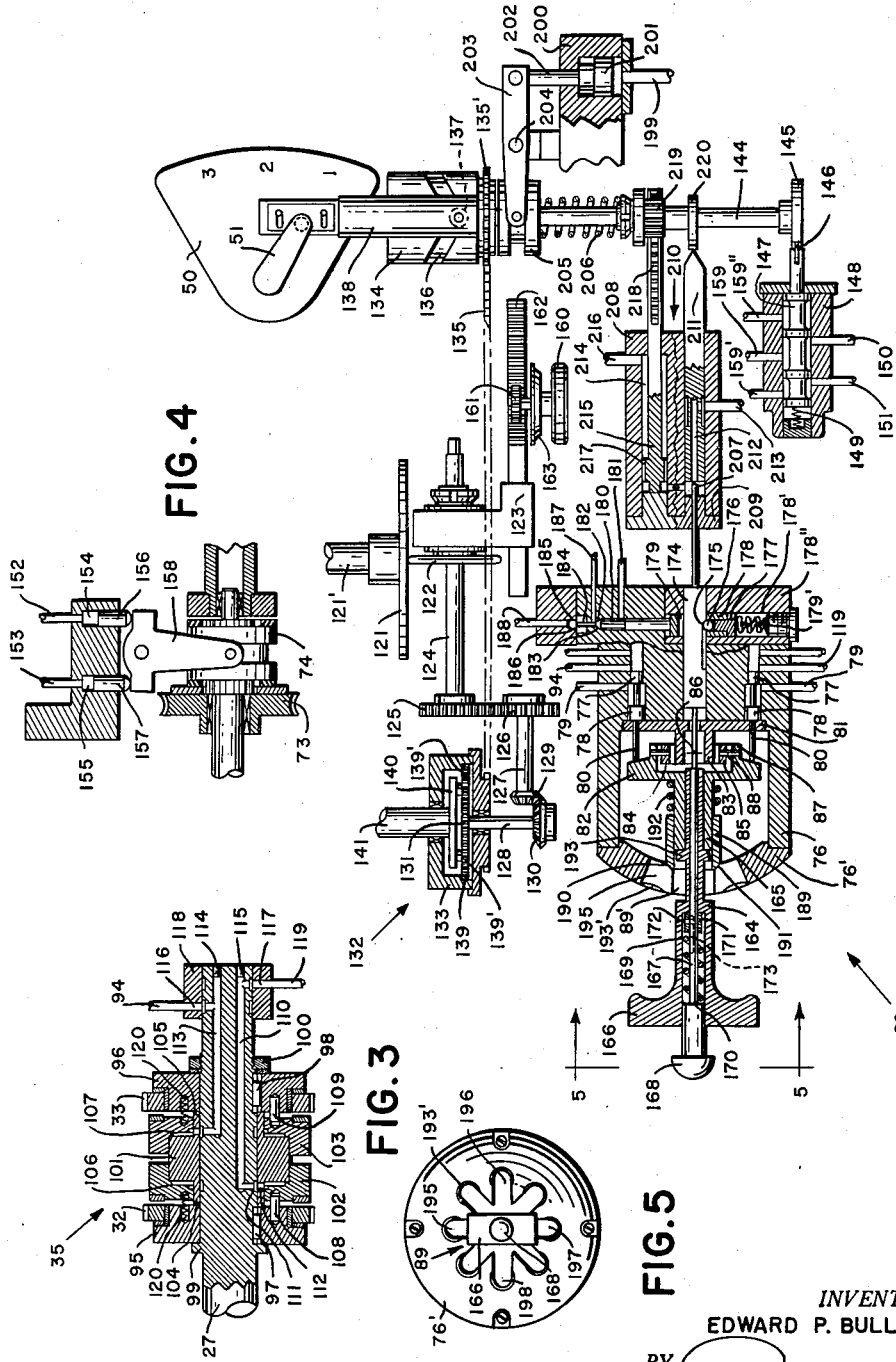
INVENTOR.
EDWARD P. BULLARD III
BY
ATTORNEY

2,972,907
MACHINE TOOL FEEDWORKS
Edward P. Bullard III, Southport, Conn.
(Cherry Lane, Fairfield, Conn.)
Filed Nov. 20, 1958, Ser. No. 775,307)
24 Claims. (Cl. 74—750)

The present invention relates to variable speed transmissions, and particularly to a new and improved arrangement of a plurality of such transmissions that can be set to provide a predetermined ratio of rates of operation thereof, and to a control capable of maintaining said ratio constant for any given adjustment of one transmission regardless of adjustments of another.

While the principles of the invention are applicable to any apparatus wherein a plurality of members are required to be moved in a predetermined relation to each other, they will be shown and described as applied to a feedworks and headstock transmission of a machine tool.

Heretofore, the common form of feedworks for a machine tool usually employed a plurality of feed speeds that were rendered effective through separate gearing combinations so that the power passing through the feedworks remained substantially constant for each of the plurality of feed rates. The power supplied to such feedworks usually is derived from a headstock transmission, the main function of which is to rotate a spindle to which work can be attached. In this way, the rate of feed is always related to the spindle speed and the feed rate is measured in fractions of inches per revolution of the spindle.

Many attempts have been made to provide steplessly variable feed rates for a movable machine tool member, but all have left much to be desired. Usually such attempts have included the use of a steplessly variable hydraulic system including a variable volume unit driving a constant displacement unit. Such systems produce constant torque output, and the range of low output speeds of the system occurs at the low speed range of the variable displacement unit. Both of these conditions adversely affect the low range of feeds of the movable member of the machine tool. The constant torque of such a system provides inadequate power throughout the range of operation of the system, and the low speed range of the variable displacement unit at low feed rates of the movable member is practically impossible to control accurately.

Furthermore, the use of such a hydraulic system is limited in that only one direction of rotation of the variable displacement unit can be employed. Consequently, to cover the entire range of feed and traverse rates of movement of the movable member of the machine tool, the variable displacement unit must operate at an uncontrollably slow rate of speed at the low feed rates where extreme accuracy is needed.

The principal object of this invention is to provide a plurality of variable speed transmissions that can be set to provide a predetermined ratio of rates of operation, and a control therefor that will maintain said ratio constant for any given adjustment of one transmission regardless of adjustments of another.

Another object of this invention is to provide a feedworks transmission in which separate and independently effective paths of power flow are employed, but arranged so that during the effectiveness of one, the other is conditioned preparatory to becoming effective.

Another object of this invention is to provide such a feedworks transmission in which epicyclic gearing arrangements are provided in plural paths of power flow.

Another object of this invention is to provide such a feedworks transmission in which the epicyclic gearing arrangements are acted upon by an auxiliary variable speed device and in which ratio means is provided between the epicyclic gearing arrangements and the output shaft for causing the output shaft to rotate at the same speed through either epicyclic gearing arrangement at a point within the range of speed adjustment of the auxiliary variable speed device.

Another object of this invention is to provide a feedworks transmission that is capable of steplessly varying the feed and traverse rates of movement of a machine tool member from zero to any desired rate within the limits of the design.

Another object of this invention is to provide such a feedworks transmission capable of accurately controlling the feed rate in slow feeds.

Another object of this invention is to provide such a transmission capable of providing substantially constant horsepower throughout its range of steplessly variable feed and traverse rates.

Another object of this invention is to provide a steplessly variable feedworks transmission including hydromechanical components, and wherein the low feed rates of the machine tool member occur when the hydraulic components are rotating within a speed range providing maximum efficiency of the units.

Another object of the invention is to provide such a feedworks transmission capable of relating the feed rates thereof to the spindle speed of the machine tool so that accurate feeds per revolution of the spindle can be accomplished.

Another object of the invention is to provide such a steplessly variable feedworks transmission in which the rapid traverse rates of movement of the machine tool member are unrelated to the speed of rotation of the machine tool spindle.

One aspect of this invention may be to provide a feedworks transmission having two paths of power flow between its input and output shaft and in which paths may be located separate epicyclic gearing arrangements having the usual three power transmitting elements. One of the elements of each arrangement may be driven from the power input shaft of the feedworks, and a second element of each arrangement may be driven by an adjustable auxiliary variable speed device. The auxiliary variable speed device may be of any type so long as it is capable of being adjusted in two directions within its range of speed variations. It may or may not be reversible; it may or may not be a stepless type of variable speed device; it may or may not be of a hydraulic type of steplessly variable speed device; and it may be driven by the input shaft or by any external source of power. However, under certain conditions, if the auxiliary variable speed device is driven by an external source of power, a loss of feed-back power may be experienced during a portion of the range of operation of the transmission, which otherwise could be employed to advantage.

In another aspect of the invention, the auxiliary variable speed device may be connected to the epicyclic gearing arrangements in such a manner to cause a third element of one arrangement to increase in speed and a third element of the other arrangement to decrease in speed as the auxiliary variable speed device is operated in either of its directions of speed adjustment.

Ratio means may be provided between the output shaft and the third elements of the epicyclic arrangements which increase and decrease in speed as the auxiliary variable speed device is adjusted. In the embodiment disclosed, dissimilar ratio means are employed, and they may be such as to cause the output shaft to rotate at the same speed when one of the above-referred-to elements is rotating at a speed above the base speed of its arrangement and the other is rotating at a speed below the base speed of its arrangement.

Another aspect of the invention may be to provide means for transferring the flow of power to the output shaft from one of the third elements to the other third element when said third elements are, respectively, rotating above and below the base speed of their corresponding epicyclic arrangements, or when the auxiliary variable speed device is at one limit of its speed adjustment.

In another aspect of the invention, a control may be provided for the feedworks transmission which may be capable of selecting the direction and path of movement of the movable member of the machine tool as well as the rate of feed or traverse movement thereof, and which will, during any feed selection, definitely relate the feed to the rotation of the machine tool spindle. This control may include a cam for varying the displacement of the one hydraulic unit. The operation of the cam may be effected by connecting one element of an epicyclic gearing arrangement to it, a second element thereof to the output of the feedworks, and a third element thereof to the output of a manually adjustable auxiliary variable speed system that is driven by the machine tool spindle. The construction may be such that upon manually setting to a predetermined value the variable speed system that is driven by the spindle, a differential speed will occur between its output and that of the feedworks, whereupon the one element of the last described epicyclic gearing arrangement will respond to this differential speed and turn the cam, thereby adjusting the variable displacement hydraulic unit to cause the feedworks to change its output speed so as to bring the second and third elements of the control epicyclic gearing arrangement into proper relation corresponding to the newly selected position of the one element thereof.

Another aspect of the invention may be to provide a servomechanism in combination with a rack mechanism for oscillating the control cam independently of the control auxiliary variable speed system during rapid traverse movement of the machine tool member. This may be accomplished by disengaging a clutch between the control cam and the control epicyclic gearing arrangement when traverse speed of movement of the machine tool member is desired.

The above, other objects and novel features of the invention will become apparent from the following specification and accompanying drawings, which are merely exemplary.

In the drawings:

Fig. 2 is a sectional schematic view of the components forming the control for the apparatus shown in Fig. 1;

Fig. 3 is a sectional view taken substantially along line 3—3 of Fig. 1, but rotated through 90°;

Fig. 4 is a sectional view taken substantially along line 4—4 of Fig. 1;

Fig. 5 is a view taken substantially along line 5—5 of Fig. 2; and

Figure 1:
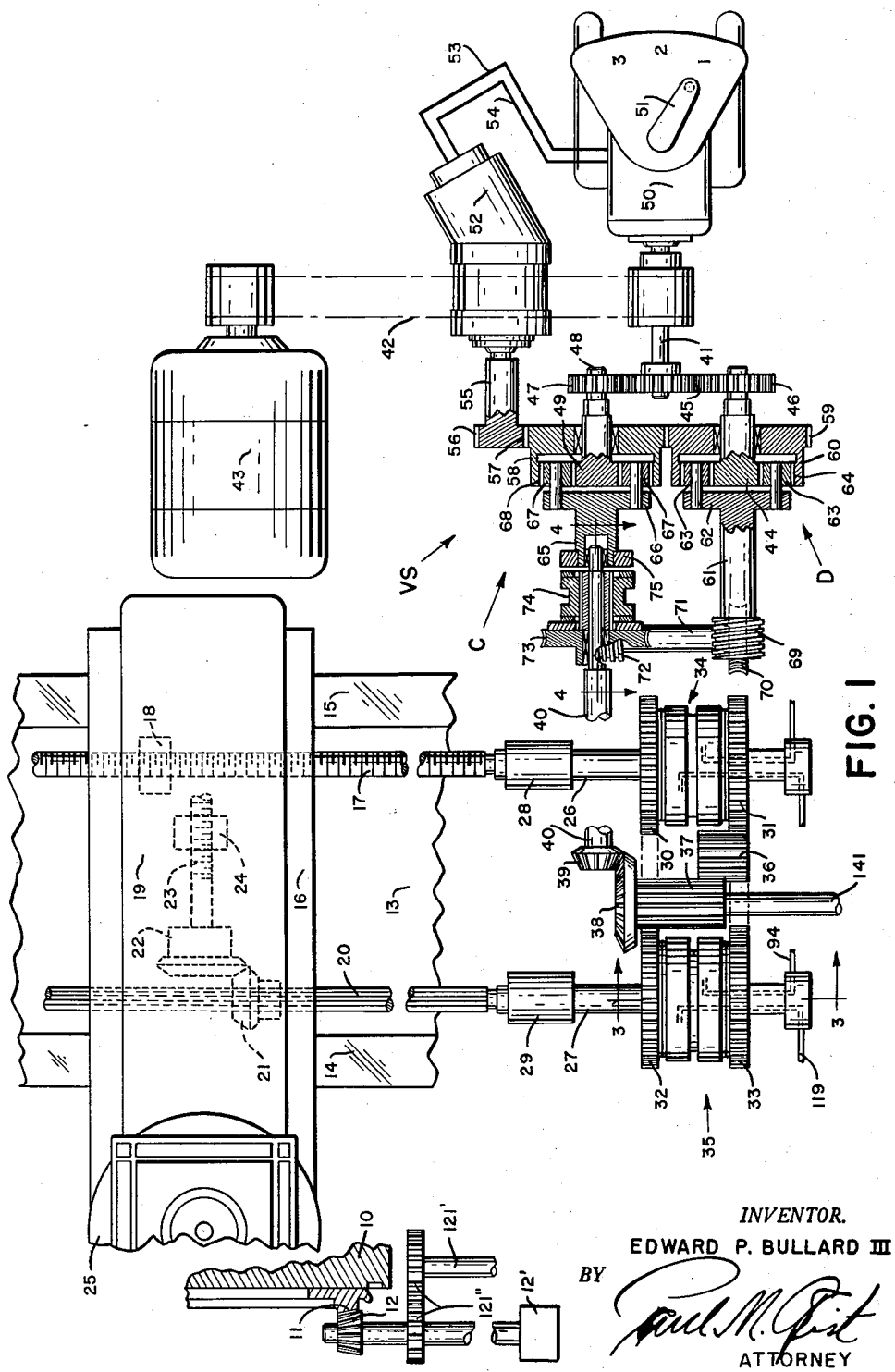
Figure 1 is a front elevational view of a portion of a machine tool to which the principles of the invention are applied.
Figure 6:
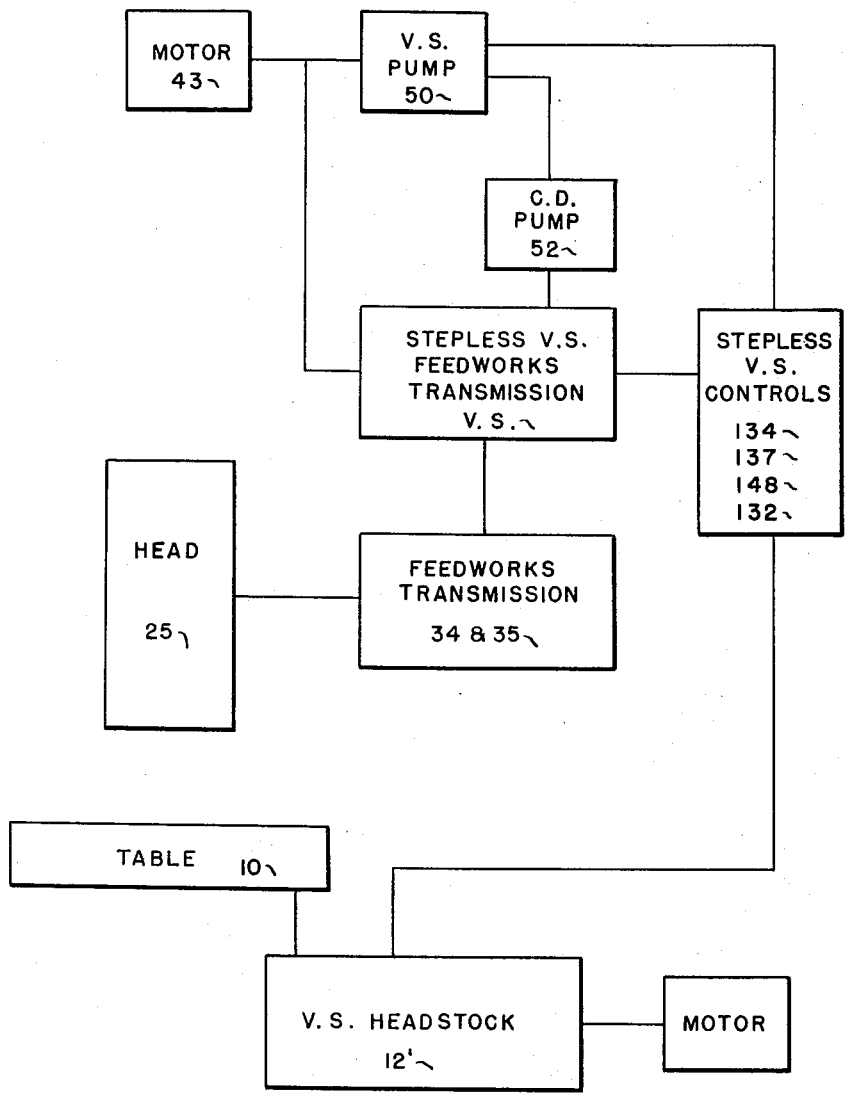
Fig. 6 is a block diagram of the components shown in Figs. 1 to 5.

Referring to Fig. 1, the principles of the invention are shown as applied to a lathe, in which only those elements are shown that are necessary to an understanding of the invention. A work supporting table 10 may include a bevel gear 11 fixed to it that may be driven by a bevel pinion 12. The bevel pinion 12 may be driven at different rates of speed by variable speed means 12' that per se forms no part of this invention. A base (not shown) may support the table 10 as well as a cross rail 13 in position relative to said table to permit one or more tool holders to be moved into engagement with work held on the table 10. The cross rail 13 may include ways 14, 15 along which a saddle 16 may be reciprocated by the rotation of a screw 17 that cooperates with a non-rotatable nut 18 fixed to the back of saddle 16. A tool slide 19 may be mounted on the saddle 16 for reciprocating movement along ways on saddle 16 at right angles to the ways 14, 15. This may be accomplished by the provision of a rotatable splined shaft 20 on which a bevel pinion 21 is splined. The pinion 21 may be mounted for rotation on, and within a cored out portion of the saddle 16, and may mesh with a corresponding bevel pinion 22 that is likewise mounted for rotation on the saddle 16. The pinion 22 may be fixed to a rotatable screw 23 that is threaded into a nut 24 that is fixed to the slide 19. From the foregoing it is evident that rotation of screw 17 in both directions will cause reciprocation of saddle 16 and with it slide 19 along ways 14, 15 of cross rail 13. And, rotation of splined shaft 20 in both directions will cause reciprocation of slide 19 along a path at right angles to the ways 14 and 15. The slide 19 may support a tool holder 25 to which tools can be fixed for cooperation with work held on the table 10.

The rotation of screw 17 and splined shaft 20 in both directions may be effected by the transmission of power through a feed bracket including parallel shafts 26 and 27 that, respectively, may be connected to screw 17 and splined shaft 20 by couplings 28 and 29. The shafts 26 and 27 may support two gears each 30, 31, 32 and 33 for free rotation. A fluid-operated clutch 34 may be located between gears 30 and 31 to selectively connect either to shaft 26; and, a similar clutch 35 may be located between gears 32 and 33 to selectively connect gears 32 and 33 to shaft 27.

A pair of elongated overlapping and intermeshing gears 36 and 37 may be mounted in such a manner relatively to gears 30, 31, 32 and 33 that gears 30 and 32 mesh with gear 37, while gears 31 and 33 may mesh with gear 36. Gears 30 and 33 are shown in a stretch-out, unmeshing position for clarity. From the foregoing it is evident that the rotation of gear 37 will cause gears 30 and 32 to rotate in the same direction, and by virtue of gear 36, will cause gears 31 and 33 to also rotate in the same direction but reversely relative to the rotation of gears 30 and 32. Accordingly, shifting of clutch 34 between its limits of motion will cause rotation of screw 17 in both directions; and shifting of clutch 35 between its limits of motion will cause rotation of splined shaft 20 in both directions.

Power may be supplied to the gear 37 through bevel gears 38 and 39, the latter of which may be connected to an output shaft 40 of a variable speed transmission VS.

Referring to Fig. 1, an input shaft 41 may be connected by suitable means such as a belt 42 to a prime mover such, for example, as a constant speed A.C. motor 43. The input shaft 41 may be connected to a first element of an epicyclic gearing arrangement D located in one path of power flow. In the embodiment disclosed, the shaft 41 is shown as connected to a sun gear 44 through gearing 45 and 46, although it is evident that any one of the three power transmitting elements of the epicyclic gearing arrangement D could have been selected.

Spur gearing including gears 45 and 47 are shown as driving a shaft 48 from shaft 41 in the same direction as gear 46 is driven from shaft 41, although the direction of rotation of shaft 48 relative to gear 46 is immaterial as will be explained hereinafter. The shaft 48 is connected to a first element of another epicyclic gearing arrangement C located in another path of power flow. While the shaft 48 may be connected to any one of the three power transmitting elements of the arrangement C, it is shown as being connected to a sun gear 49 thereof.

The shaft 41 is also connected directly to a positive displacement variable volume, hydraulic unit 50, the variable displacement of which can be changed by the movement of a lever 51 between two limiting positions at which the unit 50 delivers liquid under pressure at maximum capacity in opposite directions of flow. When the lever 51 is at its midpoint of movement, no fluid is delivered by the unit 50.

The unit 50 may be of any positive displacement variable capacity type and it may be connected to a positive displacement non-variable hydraulic unit 52 within a closed circuit including lines 53 and 54. The unit 52 may be connected to a shaft 55 that supports a gear 56 in mesh with a gear 57 mounted on a second element 58 of the epicyclic gearing arrangement C. Gear 57 may mesh with a gear 59 on a second element 60 of the epicyclic gearing arrangement D.

From the foregoing it is evident that the hydraulic units 50 and 52 comprise a variable speed device that is connected to a second element of each of the epicyclic arrangements D and C. While a hydraulic steplessly variable speed device driven from the input shaft 41 has been disclosed, it is to be understood that the variable speed device need not be of the stepless variety, of the hydraulic type, or be driven by the input shaft 41. It may comprise any form of variable speed device that can be adjusted in two directions throughout its range of speed variation. It may be driven by an external source of power, although when so driven, under certain circumstances a loss of feed-back power is experienced which latter can be utilized to advantage to a certain degree and under certain conditions of operation when the variable speel device is driven from the input shaft 41.

The second elements 58 and 60 of the arrangements C and D are shown as being rotated in opposite directions, but this is only exemplary and not to be considered as a limitation. The only reservation is that rotation of the first and second elements of each of the arrangements C and D should be such that as the variable speed device 50, 52 is operated to increase or decrease in speed, the speed of rotation of the third power transmitting element of one of the arrangements C or D increases while the speed of the third element of the other decreases.

In the embodiment disclosed, the third element of the arrangement D may comprise a shaft 61 having an arm 62, to each of the outer ends of which a planet gear 63 is journaled. The planet gears 63, of course, mesh with the sun gear 44 as well as internal gear teeth 64 of the second element 60 of the arrangement D.

The third element of the C arrangement may comprise a shaft 65 similar to shaft 61 and having an arm 66 journaling planet gears 67 that mesh with the sun gear 49 and the internal gear teeth 68 on the second element 58.

Dissimilar ratio gearing may be provided between the shafts 61, 65 and the output shaft 40. This gearing may comprise worm 69 fixed to shaft 61 that meshes with a worm gear 70 fixed to a shaft 71; a worm 72 fixed to shaft 71 may mesh with a worm gear 73 journaled on shaft 40. A clutch element 74 may be splined to shaft 40 and it may, respectively, cooperate with clutch engaging means on gear 73 and on a clutch element 75 fixed to shaft 65 in a manner presently to be described.

The hydraulic unit 50 is adapted to drive shaft 55 at a maximum speed in one direction at a 1:1 ratio, when its lever 51 is in the number 1 position, and to drive shaft 55 at a maximum speed in the opposite direction at a 1:1 ratio when lever 51 is in its number 3 position. When lever 51 is in its number 2 position, shaft 55 is not driven by unit 50. With the shaft 55 rotating at a maximum speed in either direction, the reactors 58 and 60 are rotating in opposite directions at maximum speed. Since the sun gears 44 and 49 are rotating in the same direction, it is evident that the shaft 61 or 65 of the epicyclic gearing arrangements D or C, the reactor of which is rotating oppositely to its sun gear, will rotate at a speed below base speed of its corresponding arrangement, while the other shaft of the two will be rotating at a speed above base speed. Assuming that the arrangement D is the one in which its reactor 60 rotates oppositely to its sun gear 44 when lever 51 is in its number 1 position, if the proper gear ratios and the proper speed of shaft 55 are employed, shaft 61 can be standing still when reactor 60 is rotating at the proper speed incident to lever 51 being in its number 1 position.

With clutch 74 in engagement with worm gear 73, and moving lever 51 toward its number 2 position, the speed of shaft 40 will increase steplessly from zero to a speed coincident with the lever 51 arriving at its number 2 position, where reactor 60 is stopped and shaft 61 is rotating at the base speed of the arrangement D. Continued movement of lever 51 toward its number 3 position causes reactor 60 to increase in speed from zero, but in a direction reversely to that in which it was rotating during the period when lever 51 was moved from its number 1 to its number 2 position. Expressed differently, reactor 60 now rotates in the direction of its sun gear 44. This, of course, causes shaft 61 and shaft 40 to increase in speed to a maximum for the transmission of power through the D epicyclic gearing arrangement.

When lever 51 is at its number 3 position, the reactor 58 is rotating in a direction opposite to its sun gear 49 and at a maximum speed so that shaft 65 is rotating at a speed below the base speed of the epicyclic gearing arrangement C. By employing the proper gear ratio between shaft 61 and shaft 40, the speed of shaft 65 can be made to equal the speed of shaft 40 when lever 51 is in its number 3 position so that clutch 74 can be shifted from engagement with worm gear 73 and into engagement with clutch element 75.

Movement of lever 51 from its number 3 position to its number 2 position causes reactor 58 to decrease in speed to a stopped condition and consequently causes a stepless increase in speed of shaft 65 and shaft 40. Movement of lever 51 to its number 1 position, of course, reverses the rotation of reactor 58 causing the speed of shafts 65 and 40 to continue to increase to the top limit of the epicyclic gearing arrangement C.

By employing a relatively high gear ratio between shaft 61 and shaft 40, and a direct connection between shaft 65 and shaft 40, during initial movement of lever 51 from its number 1 to number 3 position and with clutch 74 clutched to 73, the speed of shaft 40 can be steplessly varied over a relatively small range of speeds, i.e., speeds from 0 to about 23 r.p.m. And, during movement of lever 51 from its number 3 to number 1 position with clutch 74 clutched to element 75, the speed of shaft 40 may be steplessly varied from 23 r.p.m. to about 950 r.p.m. Accordingly, the low range of 0 to 23 r.p.m. as well as the lower end of the high range may be utilized for feed movements of the tool, and the range of 0 to 950 r.p.m. may be utilized for traverse speeds of the tool. These speeds of shaft 40 are merely one example that results from the selection of certain gear ratios. It is, of course, understood that any desired low and high speed range can be achieved by the proper selection of gear ratios.

In order to operate the feedworks transmission to cause movement of the tool support in either direction along either of its paths of motion and at any predetermined feed or traverse speed, a control for the feedworks is provided. Referring to Fig. 2, the control may include a valve body 76 having four reciprocable valve spools therein at 90-degree intervals (only two of which are shown).

Each spool may include piston portions 77 and 78 of different effective areas between which a port 79 may be located and connected to a supply of pressure fluid.

A stem 80 may extend outwardly from the piston portion 77 through an aperture in a plate 81. The stem 80 may contact a surface on a universally movable plate 82 that is connected to a boss 83 of plate 81 through a universal joint 84. The universal joint 84 may include a ring 85 that is trunnioned to boss 83 along an axis 86, and a ring portion 87 that is trunnioned to ring 85 along an axis 88 at right angles to axis 86. Accordingly, plate 82 may be moved universally relatively to the stems 80 of the four valves within body 76.

A handle 89 may be attached to the plate 82 and may extend outwardly from body 76 through an opening 89' therein. The valves within the body 76 can be actuated by operating the handle 89, the features of construction of which will be described later. Suffice it to say at this point in the description that movement of the handle 89 upwardly will cause plate 82 to force the upper stem 80 (Fig. 2) and piston portions 77 and 78 inwardly, thereby connecting the upper supply port 79 to a line 94 leading to the fluid-operated clutch 35 causing the correct portion thereof to become effective to rotate splined shaft 20 in the correct direction to effect vertically upward movement of the slide 19.

The clutch 35 may include opposed discs 95 and 96 for supporting gears 32 and 33. The discs 95 and 96 may be fixed to shaft 27 by keys 97 and 98 between a collar 99 integral with shaft 27 and a nut 100 threaded thereon. Between discs 95 and 96 and floating on shaft 27 may be a spacer 101 having friction clutch discs 102 and 103 journaled on opposed sleeve-like portions 104 and 105. The discs 102 and 103 are provided with recesses 106 and 107, respectively, that form with opposed faces of spacer 101 fluid chambers for a purpose to be described later.

The discs 95 and 102 may be fixed against relative rotation by pins 108 which permit relative axial movement thereof. Likewise, discs 96 and 103 may be fixed against relative rotation by pins 109 which permit relative axial movement thereof.

A duct 110 extending axially within shaft 27 may communicate with chamber 106 through a groove 111 in the periphery of shaft 27 and a radial passage 112 extending through sleeve 104 and opening into chamber 106. Another duct 113 may communicate with chamber 107 in the same way. Both ducts 110 and 113 are closed by plugs 114 and 115, and are, respectively, supplied with pressure fluid through radial passages 116 and 117 within a stationary distributor 118 that journals shaft 27. The line 94 is connected to passage 116, and a line 119 leading from valve body 76 is connected to passage 117.

From the foregoing it is evident that movement of hand lever 89 upwardly will cause pressure fluid to effect driving engagement between clutch 103 and gear 33 to cause upward movement of tool head 25, and downward movement of lever 89 will cause pressure fluid to effect driving engagement between clutch 102 and gear 32 to cause downward movement of tool head 25. Movement of lever 89 to the position shown in Fig. 2 will disengage clutch discs 102, 103 from engagement with their respective gears 32 and 33 by the action of springs 120.

In a similar manner, clutch 34 may be caused to engage gear 31 for reflecting leftward movement of head 25 when lever 89 is moved leftwardly in a horizontal plane, and clutch 34 may be caused to engage gear 30 for effecting rightward movement of head 25 when lever 89 is moved rightwardly.

The cap 76' of the housing 76 may be turned about the axis of lever 89 through 45°, in which case lever 89 may be moved along a 45-degree path in each of the four quadrants, causing simultaneous engagement of the two clutches 34 and 35 in a manner to effect movement of head 25 along a 45-degree path in any of the four quadrants.

In order to produce the correct feed rate at which the tool head 25 is to move and to relate it to the speed of rotation of the work support 10, a control for the operation of the lever 51 of the hydraulic unit is provided. It may include a friction disc 121 that is driven at a rate of speed proportional to the speed of rotation of work support 10 by a shaft 121' that is geared to the shaft that drives bevel gear 12 by gearing 121''. The disc 121 may be resiliently urged into engagement with a friction disc 122 that is mounted for rotation on a carriage 123 that in turn is mounted for reciprocable movement on a shaft 124 that may be splined to disc 122.

The shaft 124 may fixedly support a gear 125 that meshes with a gear 126 fixed to a shaft 127 that is connected to a shaft 128 through bevel gears 129 and 130. The shaft 128 may be fixed to a sun gear 131 of an epicyclic gearing arrangement 132, the reactor 133 of which may be geared or otherwise connected to a barrel cam 134 through a chain 135 or the like that engages a sprocket 135' that is clutched to the cam 134 during feeding operations as will be explained later.

The barrel cam 134 may include a cam path 136 in which a roll 137 may ride. The roll 137 is journaled on a pin at the end of a rod 138 that is connected to the free end of lever 51 of the hydraulic unit 50. Rotation of cam 134 through substantially 180° from the position shown in the drawing will effect the movement of lever 51 from its number 1 to its number 3 position; while continued rotation of cam 134 throughout substantially the next 180° will effect the movement of lever 51 from its number 3 position to its number 1 position. The cam 134 is adapted to oscillate within a little less than 360°, as will be described later.

The reactor 133 is also provided with an internal ring gear 139 that meshes with planet gears 139' journaled on pins at each end of an arm 140 that is connected to a shaft 141. The shaft 141 may be connected to shaft 40 (Fig. 1) through bevel gears.

The cam 134 may include a shaft 144 on the lower end of which a cam 145 may be fixed. The cam 145 cooperates with a roller 146 on a spool 147 of a valve 148. The spool 147 is urged in a direction by a spring 149 to be maintained in contact at all times with cam 145. The valve 148 includes ports 150 and 151 that are in communication through lines 152 and 153 with cylinders 154 and 155 within which pistons 156 and 157 are mounted. The pistons 156 and 157 act on opposite arms of a pivoted actuator 158 that is adapted to shift clutch 74 between its limits of motion.

With the parts in the condition shown in the drawings, and with table 10 rotating at a pre-selected speed, disc, 121 is rotating at a speed proportional to that of table 10, but disc 122 is not rotating since its point of contact with disc 121 is on the axis of rotation of disc 121. Also, since lever 51 is in its number 1 position, shaft 55 is rotating at a speed such that shaft 61 is not rotating. Furthermore, cam 145 is in a position such that fluid pressure from a line 159 causes engagement of clutch 74 with gear 73.

Movement of carriage 123 rightwardly from the position shown causes sun gear 131 to begin rotating through gear train 125, 126, 129 and 130. Rotation of sun gear 131 causes reactor 133 to rotate, which in turn rotates cam 134 through chain 135 to cause lever 51 to move toward its number 2 position, thereby causing shaft 61 to increase in speed from zero and, consequently, shaft 40 to increase in speed from zero. When the carriage has been moved to a desired location to indicate on a scale a desired rate of rotation of shaft 40 and, consequently, a desired feed rate of the head 25, the cam 134 will continue to move lever 51 to a point between its number 1 and number 3 positions where unit 50 will cause shaft 40 to rotate at the desired speed, at which time the combined rotations of sun gear 131 and arm 140 will effect the stopping of the reactor 133 and thereby maintain the desired feed rate of the head 25. The location of the carriage 123 can be changed by rotating a handwheel 160 that supports a pinion 161 in mesh with a rack 162 that is connected to the carriage 123. A dial 163 may be fixed to handwheel 160 and it may be calibrated in fractions of an inch feed per revolution of the table 10.

When it is desired to move the head 25 at a preselected feed rate in a given direction along either of its paths, or simultaneously along two of its intersecting paths, one or two of the valves within the body 76 are adapted to be actuated by the movement of the lever 89.

Referring to Fig. 2, the lever 89 may comprise a tubular member 164 that is telescopingly received within a sleeve 165 integral with plate 82. The outer end of member 164 may include a grip member 166, and a rod 167 may extend through the member 164 from a push button end 168 on the outside of grip 166 to a point within the sleeve 165. A spring 169 may be located within grip 166 between a shoulder 170 on rod 167 and a collar 171 surrounding rod 167, and arranged for limited axial movement therealong. A pin 172 may extend from collar 171 to within a notch 173 within the rod 167. The inner end of rod 167 is fixed to one end of a flexible Bowden wire, the opposite end of which is attached to a reciprocable valve actuator 174 within the body 76.

The actuator 174 may include a cam surface 175 adapted to cooperate with a ball 176 that rests on a plug 177 within the end of a valve rod 178 that is adapted to be reciprocated within a cylinder 178' of a valve body 178". The valve rod 178 may include a passage 179 therein through which the actuator 174 extends. A spring 179' normally urges the valve rod 178 upwardly so that ball 176 cooperates with actuator 174. The valve rod 178 may include a reduced diameter portion 180 that is adapted to cooperate with an exhaust port 181. A seat 182 may be provided on the reduced diameter portion 180 for cooperation with a mating seat 183 within the body 178".

The valve rod 178 also includes another reduced diameter portion 183 adapted to cooperate with a ball 185 that normally rests on a seat 186 between a port 187 and a constant pressure fluid inlet port 188.

In order normally to centralize the lever 89, a sleeve 189 is slidingly mounted on the sleeve 165, and it includes a chamfered edge 190 adapted to cooperate with a mating seat 191 within the cover 76' of the body 76. A spring 192 surrounding the sleeve 165 acts on the plate 82 and the sleeve 189, urging the latter outwardly. A collar 193, integral with rod 164, is adapted to be positioned on the outside of the cap 76' for effecting a feeding operation of the head 25, and on the inside of said body for effecting a traverse motion of head 25, as will be explained later.

Pulling the grip 166 outwardly causes spring 169 to force rod 167 outwardly with it so that the lefthand end of actuator 174 abuts against plate 81, thereby stopping the outward movement of rod 167. Continued outward pulling of grip 166 withdraws collar 193 from opening 89' so that when lever 89 is moved away from its central neutral position, collar 193 will rest on the outer surface of the cap 76'. This arrangement prevents moving the button 168 inwardly, the significance of which will appear later. Additionally, with collar 193 on the outside of body 76, the cam 175 on actuator 174 forces the valve rod 178 downwardly, thereby causing ball 185 to seat, which opens port 187 to the exhaust port 181, all for a purpose to be described later.

The cap 76' of body 76 may have slots 195 and 196 at 90-degree intervals about the central axis of portion 76' and which slots extend on each side of said axis. The cap 76' may be turned through 45° so that lever 89 may be moved along paths that are vertical, horizontal, or at 45° to vertical and horizontal to selectively actuate one or two of the valves within body 76 to cause movement of the head 25 along a path and in a direction corresponding to the path and direction of movement of lever 89. The head 25 will be moved along the selected path at a feed rate depending upon the preset condition of the dial 163 which controls the location of the disc 122 relatively to the disc 121.

Since traverse speed of head 25 is not desirably related to the rotation of the work support 10, means is provided for controlling it independently of the rotation of the work support 10. Accordingly, with the lever 89 in the position shown in Fig. 2, the spring 169 has separated grip 166 from button 168; collar 193 is inside the cap 76' of the body 76; and actuator 174 is in position such that spring 179' forces valve rod 178 upwardly to close communication between exhaust port 181 and port 187, and to open the latter to communication with the pressure fluid port 188.

The port 187 is connected to a line 199 leading to a cylinder 200 within which a piston 201 is mounted for reciprocation. A piston rod 202 connected to piston 201 is also connected to one end of a lever 203 that is pivoted at 204. The opposite end of lever 203 engages a clutch element 205 mounted on shaft 144 and which is normally engaged with cam drum 134 by the action of a spring 206. However, when port 187 is in communication with port 188, clutch 205 is disengaged from drum 134 by the action of piston 201 being forced upwardly. Accordingly, cam drum 134 may then be oscillated to effect movement of lever 51 independently of the control including the discs 121 and 122.

In order to control the movement of drum 134 for traverse movement of head 25, a stem 207 is connected to the valve actuator 174 and it extends into a cylinder 208 through a gland 209 of a servomechanism 210. A rod 211 is mounted within the servomechanism 210 in axial alignment with stem 207 and it includes a chamber 212 adapted to snugly receive the end of the stem 207. An exhaust port 213 leads from chamber 212 to atmosphere for a purpose to be described later.

Another cylinder 214 parallel to cylinder 208 is also located within the servomechanism 210 and a piston 215 is mounted for reciprocation therein. Constant pressure is adapted to be supplied to cylinder 214 on the righthand side of piston 215 through a port 216. A small passage 217 extends through the piston 215, establishing restricted communication between the spaces within cylinder 214 on each side of the piston 215. Additionally, the effective area of the lefthand side of piston 215 is greater than that of the righthand side thereof. The tail rod of the piston 215 includes a rack 218 that meshes with a pinion 219 fixed to shaft 144. A cam 220 on shaft 144 controls the motion of the rod 211 to provide the follow-up action of the servomechanism.

The construction and arrangement of the parts of the servo device 210 are such that normally the righthand end of stem 207 is spaced slightly from the lefthand, or entrance end of chamber 212, so that the leakage of fluid therepast to exhaust equals the passage of fluid through the small passage 217. Accordingly, the piston 215 normally remains in the position shown in the drawing.

Movement of the stem 207 rightwardly will prevent the escape of pressure fluid through the exhaust port 213 and, consequently, will cause the pressure in both sides of piston 215 to equalize. Since the lefthand side has a greater effective area than the righthand side, piston 215 moves rightwardly, causing the rack 218 to rotate cam drum 134 through pinion 219. This, of course, causes lever 51 to be moved to thereby vary the speed of rotation of pump 52.

With the apparatus in the condition shown in the drawings, and referring to Fig. 2, clutch 205 is disengaged since valve 177 is in its raised position causing pressure fluid to flow from line 188 past ball 185, through line 187 to line 199. Accordingly, the control of the movement of cam 134 is disconnected from the epicyclic gearing train 132 and the handwheel 160.

Movement of lever 89 upwardly in slot 195 (Fig. 5) will cause the rightward movement of the upper valve stems 80 (Fig. 2) to open line 94 to supply line 79, thereby driving spline 20 through gear 33 (Fig. 1) to effect upward movement of the head 25 upon rotation of the output shaft 40 of the variable speed transmission VS (Fig. 1).

Pressing button 168 inwardly causes the righthand end of stem 207 to move into chamber 212, preventing the leakage of pressure fluid from the lefthand end of chamber 214 from exhausting to line 213. This causes the pressure on both sides of piston 215 to equalize, and since the lefthand effective area of piston 215 is greater than that of the righthand side, rack 218 moves rightwardly, thereby rotating cam 134 and moving lever 51 from its number 1 position (where the maximum speed of variable volume pump 50 is rotating reactor 60, Fig. 1, at a speed and in a direction to effect zero rotation of shaft 40) toward its number 2 position. As lever 51 moves toward its number 2 position, the speed of reactor 60 decreases, thereby increasing the speed of rotation of shaft 61 and hence shaft 40. As previously explained, when lever 51 is at its number 2 position, the reactor 60 is stopped and shaft 61 is rotating at the base speed of the epicyclic gearing arrangement D.

Continued movement of lever 51 from its number 2 position to its number 3 position reverses the direction of rotation of reactor 60, thereby increasing the rotation of shaft 40 above base speed until shaft 61 is rotating at the maximum speed it can be driven by the D epicyclic gearing arrangement.

During movement of lever 51 from its number 1 to its number 3 position, the reactor 58 has been rotating at the same speed but in an opposite direction to that of reactor 60. Accordingly, when lever 51 is at its number 3 position, reactor 58 is rotating at a maximum speed in a direction opposite to that of its sun gear 49. This maximum speed of reactor 58 may provide a speed of rotation of shaft 65 which will be synchronous with the speed of shaft 40 that is driven by the D epicyclic gearing arrangement through reduction gearing 69, 70, 72 and 73. Accordingly, clutch 74 can be shifted from engagement with gear 73 to engagement with clutch 75 providing a direct drive between shaft 65 and shaft 40.

Referring to Fig. 2, spool valve 147, in the position shown, passes pressure fluid from supply line 159 to cylinder 154 (Fig. 4), causing clutch 74 to drivingly engage gear 73, and connects cylinder 155 to an exhaust line 159'. Cam 145 may be designed to shift spool valve 147 leftwardly when cam 134 has been rotated to a point where arm 51 is at its number 3 position when shafts 40 and 65 are at synchronous speed. At this position of arm 51, pressure fluid from supply line 159 passes through line 151 to cylinder 155, while cylinder 154 is open to an exhaust line 159''.

Continued movement of button 168 causes continued rightward movement of rack 218 as previously explained, and the design of the cam path 136 is such that arm 51 begins to move from its number 3 position through its number 2 position to its number 1 position. As arm 51 moves from its number 3 to its number 2 position, the speed of reactor 58 decreases, thereby effecting an increase in the speed of shaft 40 until reactor 58 stops when lever 51 is at its number 2 position, causing the shaft 40 to rotate at the base speed of the epicyclic gearing arrangement C. Continued movement of arm 51 from its number 2 to its number 1 positions reverses the direction of rotation of reactor 58 so that it rotates in the direction of its sun gear 49 at increasing speeds, thereby further increasing the speed of the shaft 40 to the maximum speed attainable with the epicyclic gearing arrangement C.

From the foregoing it is evident that the screw 17 or splined shaft 20 can be rotated at steplessly variable traverse speeds in either direction from zero to the maximum speed obtainable with the feedworks including the epicyclic gearing arrangements C and D.

In order to produce a feeding motion of the head 25, the hand grip 166 is pulled leftwardly (Fig. 2) until collar 193 is located outside of the cap 76' when the lever 89 may be shifted along one of the slots 195 and 196 in cap 76' until the bottom of collar 193 rests in one of the depressions 193'. In this position, button 168 cannot be depressed. Furthermore, moving hand grip 166 leftwardly causes cam 175 to force valve stem 178 downwardly so that line 187 and cylinder 200 are open to exhaust 181, whereupon spring 206 effects engagement between clutch 205 and cam 134. Accordingly, chain 135 is now effective to rotate cam 134 in response to rotation of the reactor 133 of the epicyclic gearing 132.

With the arm 51 at its number 1 position and disc 122 located centrally of disc 121, shaft 40 will, of course, not rotate, even though disc 121 is rotating proportionally to that of the table 10. Consequently, sun gear 131 and shaft 141 are stationary.

Turning handwheel 160 causes disc 122 to move radially off the center of disc 121, causing sun gear 131 to rotate thereby causing reactor 133 to rotate, which latter rotation is transmitted to cam 134 through chain 135. This causes arm 51 to be moved from its number 1 position toward its number 2 position, thereby starting the rotation of shaft 40 and, consequently, the movement of head 25. When the speed of shaft 40 reaches the value corresponding to the setting of disc 122 relatively to disc 121, the reactor gear 133 stops, thereby maintaining the arm 51 in position to maintain the feed movement of head 25 at the value corresponding to the setting of the disc 122 relatively to disc 121.

The above described epicyclic gearing 132 constitutes an important feature of this invention in that it acts as a sensing control that compensates for any variation in efficiency of the hydraulic units 50 and 52 and still maintains the exact feed of the head 25 in a direct relation to the rate of rotation of the work supporting table 10.

Although the various features of the new and improved feedworks transmission have been shown and described in detail to fully disclose one embodiment of the invention, it will be evident that numerous changes may be made in such details, and certain features may be used without others without departing from the principles of the invention.

What is claimed is:

1. Apparatus comprising in combination, a member; a variable speed means for moving said member along a path at varying rates of motion; another member; separate variable speed means for moving said other member along a path at varying rates of motion; means for adjusting the variable speed means of one of said members to provide a predetermined ratio of movements of said members relatively to each other; epicyclic gearing means including three motion transmitting elements; means for connecting each of said variable speed means to separate of said motion transmitting elements; and means for connecting the third motion transmitting element of said epicyclic gearing means to the means for adjusting the variable speed means of one of said members, whereby said ratio of movements of said members relatively to each other is maintained constant for any given adjustment of said variable speed means of said one of said members regardless of adjustments of said other variable speed means.

2. Apparatus comprising in combination, a member; a variable speed means for moving said member along a path at varying rates of motion; another member; separate variable speed means for moving said other member along a path at varying rates of motion; means for steplessly adjusting the variable speed means of one of said members to provide a predetermined ratio of movements of said members relatively to each other; epicyclic gearing means including three motion transmitting elements; means for connecting each of said variable speed means to separate of said motion transmitting elements; and means for connecting the third motion transmitting element of said epicyclic gearing means to the means for adjusting the variable speed means of one of said members, whereby said predetermined ratio of movements of said members relatively to each other is maintained constant for any given adjustment of said variable speed means of said one of said members regardless of adjustments of said other variable speed means.

3. Apparatus comprising in combination, a member; a variable speed means for moving said member along a path at varying rates of motion; another member; separate variable speed means for moving said other member along a path at varying rates of motion; fluid operated means for steplessly adjusting the variable speed means of one of said members to provide a predetermined ratio of movements of said members relatively to each other; and epicyclic means for maintaining said ratio constant for any given adjustment of the variable speed means of said one of said members regardless of adjustments of said other variable speed means.

4. Apparatus comprising in combination, a member; a variable speed means for moving said member along a path at varying rates of motion; another member; separate variable speed means for moving said other member along a path at varying rates of motion; fluid operated means for steplessly adjusting the variable speed means of one of said members to provide a predetermined ratio of movements of said members relatively to each other; epicyclic gearing means including three motion transmitting elements; means for connecting each of said variable speed means to separate of said motion transmitting elements; and means for connecting the third motion transmitting element of said epicyclic gearing means to the means for adjusting the variable speed means of one of said members, whereby said ratio of movements of said members relatively to each other is maintained constant for any given adjustment of said variable speed means of said one of said members regardless of adjustments of said other variable speed means.

5. Apparatus comprising in combination, a member; a variable speed means for moving said member along a path at varying rates of motion; another member; separate variable speed means for moving said other member along a path at varying rates of motion; means for adjusting the variable speed means of one of said members to provide a predetermined ratio of movements of said members relatively to each other; sensing means common to both of said variable speed means for maintaining said ratio constant for any given adjustment of the variable speed means of said one of said members regardless of adjustments of said other variable speed means; and means for adjusting said one of said variable speed means independently of said sensing means.

6. Apparatus comprising in combination, a member; a variable speed means for moving said member along a path at varying rates of motion; another member; separate variable speed means for moving said other member along a path at varying rates of motion; means for adjusting the variable speed means of one of said members to provide a predetermined ratio of movements of said members relatively to each other; means including epicyclic gearing means for maintaining said ratio constant for any given adjustment of the variable speed means of said one of said members regardless of adjustments of said other variable speed means; and means for adjusting said one of said variable speed means independently of said ratio maintaining means.

7. Apparatus comprising in combination, a member; a variable speed means for moving said member along a path at varying rates of motion; another member; separate variable speed means for moving said other member along a path at varying rates of motion; means for adjusting the variable speed means of one of said members to provide a predetermined ratio of movements of said members relatively to each other; an epicyclic gearing means having one member driven by said one variable speed means, another member driven by the other variable speed means, and a third member connected to the means for adjusting the variable speed means of one of said members for maintaining said ratio constant for any given adjustment of the variable speed means of said one of said members regardless of adjustments of said other variable speed means; and means for adjusting said one of said variable speed means independently of said ratio maintaining means.

8. Apparatus comprising in combination, a member; a variable speed means for moving said member along a path at varying rates of motion; another member; separate variable speed means for moving said other member along a path at varying rates of motion; means for steplessly adjusting the variable speed means of one of said members to provide a predetermined ratio of movements of said members relatively to each other; sensing means common to both of said variable speed means for maintaining said ratio constant for any given adjustment of the variable speed means of said one of said members regardless of adjustments of said other variable speed means; and means for adjusting said one of said variable speed means independently of said sensing means.

9. Apparatus comprising in combination, a member; a variable speed means for moving said member along a path at varying rates of motion; another member; separate variable speed means for moving said other member along a path at varying rates of motion; means for steplessly adjusting the variable speed means of one of said members to provide a predetermined ratio of movements of said members relatively to each other; means including an epicyclic gearing means for maintaining said ratio constant for any given adjustment of the variable speed means of said one of said members regardless of adjustments of said other variable speed means; and means for adjusting said one of said variable speed means independently of said ratio maintaining means.

10. Apparatus comprising in combination, a member; a variable speed means for moving said member along a path at varying rates of motion; another member; separate variable speed means for moving said other member along a path at varying rates of motion; means for steplessly adjusting the variable speed means of one of said members to provide a predetermined ratio of movements of said members relatively to each other; an epicyclic gearing means having one member driven by said one variable speed means, another member driven by the other variable speed means, and a third member connected to the means for adjusting the variable speed means of one of said members for maintaining said ratio constant for any given adjustment of the variable speed means of said one of said members regardless of adjustments of said other variable speed means; and means for adjusting said one of said variable speed means independently of said ratio maintaining means.

11. Apparatus comprising in combination, a member; a variable speed means for moving said member along a path at varying rates of motion; another member; separate variable speed means for moving said other member along a path at varying rates of motion; fluid operated means for steplessly adjusting the variable speed means of one of said members to provide a predetermined ratio of movements of said members relatively to each other; means for maintaining said ratio constant for any given adjustment of the variable speed means of said one of said members regardless of adjustments of said other variable speed means; and means for adjusting said one of said variable speed means independently of said ratio maintaining means.

12. Apparatus comprising in combination, a member; a variable speed means for moving said member along a path at varying rates of motion; another member; separate variable speed means for moving said other member along a path at varying rates of motion; fluid operated means for steplessly adjusting the variable speed means of one of said members to provide a predetermined ratio of movements of said members relatively to each other; sensing means common to both of said variable speed means for maintaining said ratio constant for any given adjustment of the variable speed means of said one of said members regardless of adjustments of said other variable speed means; and means for adjusting said one of said variable speed means independently of said sensing means.

13. Apparatus comprising in combination, a member; a variable speed means for moving said member along a path at varying rates of motion; another member; separate variable speed means for moving said other member along a path at varying rates of motion; fluid operated means for steplessly adjusting the variable speed means of one of said members to provide a predetermined ratio of movements of said members relatively to each other; means including an epicyclic gearing means for maintaining said ratio constant for any given adjustment of the variable speed means of said one of said members regardless of adjustments of said other variable speed means; and means for adjusting said one of said variable speed means independently of said epicyclic gearing means.

14. Apparatus comprising in combination, a member; a variable speed means for moving said member along a path at varying rates of motion; another member; separate variable speed means for moving said other member along a path at varying rates of motion; fluid operated means for steplessly adjusting the variable speed means of one of said members to provide a predetermined ratio of movements of said members relatively to each other; an epicyclic gearing means having one member driven by said one variable speed means, another member driven by the other variable speed means, and a third member connected to the means for adjusting the variable speed means of one of said members for maintaining said ratio constant for any given adjustment of the variable speed means of said one of said members regardless of adjustments of said other variable speed means; and means for adjusting said one of said variable speed means independently of said epicyclic gearing means.

15. Apparatus comprising in combination, a member adapted to be moved along a path; a variable speed transmisison for moving said member along said path and including plural paths of power flow, each having an epicyclic gearing arrangement therein; means for rendering effective one of said paths of power flow independently of the other; an auxiliary variable speed device connected to said epicyclic gearing arrangements for causing an element of each arrangement, respectively, to increase and decrease in speed relatively to the base speed of its corresponding arrangement when the speed of the auxiliary variable speed device is changed; another member; separate variable speed means for moving said other member along a path at varying rates of motion; means for adjusting said auxiliary variable speed device to provide a predetermined ratio of movements of said members relatively to each other; and means for maintaining said ratio constant for any given adjustment of the auxiliary variable speed device regardless of adjustments of said separate variable speed means.

16. Apparatus comprising in combination, a member adapted to be moved along a path; a variable speed transmission for moving said member along said path and including plural paths of power flow, each having an epicyclic gearing arrangement therein; means for rendering effective one of said paths of power flow independently of the other; an auxiliary, steplessly variable speed device connected to said epicyclic gearing arrangements for causing an element of each arrangement, respectively, to increase and decrease in speed relatively to the base speed of its corresponding arrangement when the speed of the auxiliary variable speed device is changed; another member; separate variable speed means for moving said other member along a path at varying rates of motion; means for adjusting said auxiliary variable speed device to provide a predetermined ratio of rates of movement of said members relatively to each other; and means for maintaining said ratio constant for any given adjustment of the auxiliary variable speed device regardless of adjustments of said separate variable speed means.

17. Apparatus comprising in combination, a member adapted to be moved along a path; a variable speed transmission for moving said member along said path and including plural paths of power flow, each having an epicyclic gearing arrangement therein; means for rendering effective one of said paths of power flow independently of the other; an auxiliary, fluid operated, steplessly variable speed device connected to said epicyclic gearing arrangements for causing an element of each arrangement, respectively, to increase and decrease in speed relatively to the base speed of its corresponding arrangement when the speed of the auxiliary variable speed device is changed; another member; separate variable speed means for moving said other member along a path at varying rates of motion; means for adjusting said auxiliary variable speed device to provide a predetermined ratio of rates of movement of said members relatively to each other; and means for maintaining said ratio constant for any given adjustment of the auxiliary variable speed device regardless of adjustments of said separate variable speed means.

18. Apparatus comprising in combination, a first member adapted to be moved along a path of motion; means for moving said first member along said path comprising a plurality of epicyclic gearing arrangements, each adapted independently to cause movement of said first member; a first adjustable variable speed means for simultaneously causing one member of each arrangement to rotate at a speed above and below the base speed of its corresponding arrangement; ratio means between each arrangement and said first member to cause both arrangements to move said first member at the same speed at some point of adjustment of said first variable speed means; means for transferring the flow of power from one of said arrangements to the other when said point of adjustment is reached; a second member; a second adjustable variable speed means for moving said second member along a path of motion at varying rates of motion; means for adjusting said first variable speed means to provide a predetermined ratio of rates of movement of said members relatively to each other; and means for maintaining said ratio constant for any given adjustment of the first variable speed means and regardless of adjustments of said second variable speed means.

19. Apparatus comprising in combination, a member adapted to be moved along intersecting paths; reversely rotatable means for moving said member along said paths; a transmission for rotating said reversely rotatable means and including plural power paths, each including an epicyclic gearing arrangement; reversible variable speed means for rotating corresponding elements of each arrangement in opposite directions; means for rotating other corresponding elements of said arrangements in the same direction, whereby variations of speed of said reversible variable speed means from a maximum in one direction to a maximum in the other direction enables the use of one arrangement to transmit a range of speeds to said reversely rotatable means while pre-conditioning the other arrangement for a different range of speeds;

dissimilar ratio means between said arrangements and said reversely rotatable means; and a single operating lever for causing said transmission to selectively effect movement of said member along a selected path in a selected direction at any desired rate within said ranges of speeds of said reversely rotatable means.

20. Apparatus comprising in combination, a member adapted to be moved along intersecting paths; reversely rotatable means for moving said member along said paths; a transmission for rotating said reversely rotatable means and including plural power paths, each including an epicyclic gearing arrangement; reversible, steplessly variable speed means for rotating corresponding elements of each arrangement in opposite directions; means for rotating other corresponding elements of said arrangements in the same direction, whereby variations of speed of said reversible variable speed means from a maximum in one direction to a maximum in the other direction enables the use of one arrangement to transmit a range of speeds to said reversely rotatable means while pre-conditioning the other arrangement for a different range of speeds; dissimilar ratio means between said arrangements and said reversely rotatable means; and a single operating lever for causing said transmission to selectively effect movement of said member along a selected path in a selected direction at any desired rate within said ranges of speeds of said reversely rotatable means.

21. Apparatus comprising in combination, a member adapted to be moved along intersecting paths; reversely rotatable means for moving said member along said paths; a transmission for rotating said reversely rotatable means and including plural power paths, each including an epicyclic gearing arrangement; reversible, fluid operated, steplessly variable speed means for rotating corresponding elements of each arrangement in opposite directions; means for rotating other corresponding elements of said arrangements in the same direction, whereby variations of speed of said reversible variable speed means from a maximum in one direction to a maximum in the other direction enables the use of one arrangement to transmit a range of speeds to said reversely rotatable means while pre-conditioning the other arrangement for a different range of speeds; dissimilar ratio means between said arrangements and said reversely rotatable means; and a single operating lever for causing said transmission to selectively effect movement of said member along a selected path in a selected direction at any desired rate within said ranges of speeds of said reversely rotatable means.

22. Apparatus comprising in combination, a member adapted to be moved along a path; a variable speed transmission for moving said member along said path and including plural paths of power flow, each having an epicyclic gearing arrangement therein; means for rendering effective one of said paths of power flow independently of the other; an auxiliary variable speed device connected to said epicyclic gearing arrangements for causing an element of each arrangement, respectively, to increase and decrease in speed relatively to the base speed of its corresponding arrangement when the speed of the auxiliary variable speed device is changed; dissimilar ratio means between said epicyclic gearing arrangements and the means for rendering effective the path of power flow; another member; separate variable speed means for moving said other member along a path at varying rates of motion; means for adjusting said variable speed device to provide a predetermined ratio of rates of movement of said members relatively to each other; means for maintaining said ratio constant for any given adjustment of the auxiliary variable speed device regardless of adjustments of said separate variable speed means; and means for rendering ineffective said constant ratio maintaining means during adjustment of said auxiliary variable speed device throughout its entire range of operation.

23. Apparatus comprising in combination, a member adapted to be moved along a path; a variable speed transmission for moving said member along said path and including plural paths of power flow, each having an epicyclic gearing arrangement therein; means for rendering effective one of said paths of power flow independently of the other; an auxiliary variable speed device connected to said epicyclic gearing arrangements for causing an element of each arrangement, respectively, to increase and decrease in speed relatively to the base speed of its corresponding arrangement when the speed of the auxiliary variable speed device is changed; dissimilar ratio means between said epicyclic gearing arrangements and the means for rendering effective the path of power flow; another member; separate variable speed means for moving said other member along a path at varying rates of motion; means for adjusting said variable speed device to provide a predetermined ratio of rates of movement of said members relatively to each other; means for maintaining said ratio constant for any given adjustment of the auxiliary variable speed device regardless of adjustments of said separate variable speed means; a single operating lever for causing said variable speed transmission to selectively move said member in either direction along said path at any desired rate within the entire speed range of said auxiliary variable speed device; and a servo-mechanism connected to said lever for operating said auxiliary variable speed device throughout its entire speed range independently of said constant ratio maintaining means.

24. In a machine tool, a work-supporting table; a headstock transmission for rotating said work-supporting table at varying rates; a tool support; ways for supporting said tool support for movement along two intersecting paths; separate rotatable shafts for moving said tool support along said ways; a feedworks for reversely and selectively rotating said shafts at varying rates and including two paths of power flow, each having an epicyclic gearing arrangement therein, each of which includes three power transmitting elements; a prime mover for rotating a first element of each of said epicyclic gearing arrangements in the same direction; a fluid operated, steplessly variable speed device for rotating a second element of each of said epicyclic gearing arrangements in both directions but oppositely to each other; high and low ratio means, respectively, between the third elements of said epicyclic gearing arrangements and said shafts; a steplessly variable speed device and an epicyclic gearing sensing device for providing and maintaining predetermined ratios of rates of movement of said tool support and said work-supporting table; a driving connection between said work-supporting table and said steplessly variable speed device; a driving connection between said steplessly variable speed device and one element of said epicyclic gearing sensing device; another driving connection between said feedworks and a second element of said sensing device; a driving connection between the third element of said sensing device and said fluid operated, variable speed device; a single control lever for causing the feedworks to rotate said shafts in the correct direction to move said tool support along either or both of said paths; and a servo-mechanism connected to said lever and to said fluid operated, variable speed device and adapted to operate the latter throughout its range of variable speeds independently of said sensing device.

References Cited in the file of this patent

UNITED STATES PATENTS

| 1,984,830 | Higley | Dec. 18, 1934 |
| 2,336,912 | Zimmermann | Dec. 14, 1943 |
| 2,859,290 | Grinage | Nov. 4, 1958 |
| 2,883,122 | Bowen | Apr. 21, 1959 |